Patented Sept. 12, 1939

2,172,974

UNITED STATES PATENT OFFICE 2,172,974

SATURATED FIBROUS MATERIAL AND SATURANT AND METHOD OF MAKING THE SAME

Leander H. Hills, Worcester, Mass., assignor to The Vellumoid Company, Boston, Mass., a corporation of Massachusetts No Drawing. Application January 22, 1936, Serial No. 60,359

12 Claims. (Cl. 134—26)

This invention has for an object to produce a composition and more especially one which when used as a saturant for porous material will possess certain highly desirable qualities adapting the product to a great variety of uses.

More particularly some of these qualities are: high resistance to the action of water, acids, alkalies, oils, gasoline and most solvents and reagents; flexibility; permanence; ability to strengthen the fibrous material saturated with it; high dielectric properties; lack of tendency to corrode or otherwise attack metallic or other materials with which it may be brought into contact; and ability to withstand somewhat elevated temperatures without loss of any of its desirable properties.

Among the uses of porous or fibrous material, such as paper or other sheeted material, saturated with the composition of this invention, may be mentioned gaskets for water, steam, oil, gas, or gasoline lines; gaskets to be used in contact with surfaces liable to corrosion when in contact with certain materials, as, for example, magnesium and aluminum alloys commonly used in air craft engines; masking tape employed to shield parts from being contacted by lacquers or paints, as when they are applied in spray form; insulating winding where the parts are subjected to water or oil; and as a base material for artificial leather and leather substitutes.

According to this invention the saturating compound or composition comprises a halogen compound of rubber and a bodied drying oil and more specifically a dispersion of the rubber compound in the oil. Among suitable rubber compounds commercially available is that of chlorinated rubber known to the trade as Tornesit and this invention will be described more specifically with reference to Tornesit, though other compounds of the general class indicated when available in commercial quantities and at sufficiently reasonable price might be substituted. As will later appear, tung or China-wood oil bodied in a specific manner is particularly advantageous as the drying oil. Chorinated rubber, known to the trade as "Tornesit" is an ivory to white colored powder insoluble in water but readily soluble in all aromatic hydrocarbons (benzene, toluol, xylene) and in the chlorinated aliphatic hydrocarbons such as ethylene dichloride and carbon tetrachloride. It is insoluble in aliphatic hydrocarbons and aliphatic and aromatic alcohols.

In order to combine the Tornesit with a drying oil, it is, of course, necessary to use an oil compatible with the Tornesit and for which there is a mutual solvent, and in order that the final product may have the desired characteristics the bodying of the drying oil should be accomplished without the use of substances which either in themselves or in the combination would detract from such characteristics. For example, tung or China-wood oil has heretofore been bodied by heating in the presence of rosin or other natural or synthetic resins or combinations of such material with other drying oils. The presence of rosin or the other resins mentioned renders the final product liable to attack by resin solvents, however, and is liable to cause corrosion when used in contact with some other materials such as the alloys hereinbefore mentioned. In general, tung or China-wood oil bodied by a method which constitutes one phase of this invention and without the use of resins or other oils is preferable. The bodying is done in accordance with this invention by heating the tung oil to approximately 540° F. rapidly and immediately cooling it to at least below 350° F. This treatment gives a viscosity of about Z—6 (G—H). If tung oil be allowed to remain for even a few minutes at a temperature in the neighborhood of 540° F. it sets to a gell and is spoiled for the intended use and this is to be avoided. At about 300° F. on the down heat, up to 2% of the amount of oil of an anti-oxidant is preferably added in order to prevent decreased flexibility of the impregnated sheet and disintegration of the gel with ageing. The prime requirement of an effective anti-oxidant is solubility in the oil. Of the various anti-oxidants found suitable the presence of phenol or naphthyl groups seems to be necessary. The following anti-oxidants have been used successfully:

Aldo-alpha-naphthylamine
Beta-phenyl-naphthylamine
p-Phenylphenol
p-Phenylphenolate of ethylene diphenyldiamine.

The bodied wood or tung oil is then poured slowly into the Tornesit solution (say, Tornesit dissolved in toluol) with constant stirring until the mixture is smooth and uniform. If it be attempted to pour the Tornesit solution into the oil a gell-like mass is produced which it is difficult, if not impossible, to smooth out. The proportion of bodied oil to Tornesit should be at least two to one by weight, as then the Tornesit is apparently present as the disperse phase and oil as the continuous phase of a dispersion, the proportions indicated being rather critical.

While the amount of solvent may be varied within somewhat wide limits, very satisfactory results have been produced at 62.5% of combined oil and Tornesit to 37.5% of toluol. In this composition, when used as saturant for paper of a given type and porosity, the higher the ratio of tung oil to Tornesit, or the higher the percentage of solvent, the faster the saturation, but the higher the amount of solvent the less of the dried gell materials remains in the paper. After saturation, an air drying period of, say, a minimum of two hours, to as long as production demands permit is desirable. The material may be heated thereafter but it should not be heated above 150° F. to 160° F. for this purpose and the temperature should not be raised too rapidly, as too rapid evaporation of the solvent during setting of the material tends to disrupt the gell film. Drying comprises only the removal of the solvent material and setting of the gell to a non-tacky condition. While considerable latitude in proportions of oil to Tornesit above the critical limits is permissible, about 7 to 1 has been found very satisfactory for saturating paper for gaskets and masking tape. The proper proportion depends on the characteristics desired in the final product, a larger proportion of the tung oil increasing the softness and flexibility of the product. Initial wetting of the paper in the solvent makes saturation easier, but of course dilutes the saturant in the paper and reduces the amount of the dried material in the final product. While the tung oil imparts its own distinctive odor, it may be substantially deodorized by well known methods.

There are certain marked advantages in employing such proportion of the oil to Tornesit that the Tornesit is in the condition of a dispersion in the oil, as the oil then so surrounds and protects the Tornesit in the final product after the original solvent has been removed and the gel thoroughly set that Tornesit solvents have substantially no effect on the final product. It is also possible to thin the solution of the Tornesit and oil in the Tornesit solvent with relatively cheap diluents, such as petroleum naphtha, in which Tornesit is not soluble but in which the oil is soluble, to as much as 50% of the total volatile, without precipitating the Tornesit. As this volatile is driven off in the subsequent drying and setting of the gel the use of such diluents has no harmful effect on the final product. Mixing of the Tornesit solution with a solution of the oil in a non-solvent of the Tornesit results in the precipitation of the Tornesit.

Where resistance to lacquer type solvents and corrosion of metal surfaces are not mattters of importance, somewhat increased flexibility of the product may be obtained by using bodied linseed oil with the tung oil, but in order to promote initial gelling, where linseed oil is used, a siccative must be added.

From the foregoing description of certain desirable products illustrative of the invention and methods of making the same, it should be evident to those skilled in the art that various changes and modifications might be made without departing from the spirit or scope of this invention as defined by the appended claims.

This application is a continuation in part of my application Serial No. 23,285, filed May 24, 1935.

I claim:

1. The method of bodying tung oil, which comprises heating the oil to approximately 540° F. and then before gelation occurs cooling the oil rapidly to below 350° F., the process being conducted in the absence of resin.

2. The method which comprises pouring tung oil bodied by the process of claim 1 into a solution of chlorinated rubber (Tornesit) in a solvent which is also a solvent for said oil, and while stirring the mixture.

3. The solution resulting from pouring tung oil bodied by the process of claim 1 into a solution of chlorinated rubber (Tornesit) in a solvent which is also a solvent for said oil and while stirring the mixture, and in which the amount of oil by weight is at least twice the amount of chlorinated rubber.

4. The solution resulting from pouring tung oil bodied by the process of claim 1 into a solution of chlorinated rubber (Tornesit) in a solvent which is also a solvent for said oil and while stirring the mixture, and in which the amount of oil by weight is at least twice the amount of chlorinated rubber, and which solution contains an anti-oxidant.

5. The solution resulting from pouring tung oil bodied by the process of claim 1 into a solution of chlorinated rubber (Tornesit) in a solvent which is also a solvent for said oil and while stirring the mixture, and in which the amount of oil by weight is approximately seven times the amount of chlorinated rubber.

6. The solution resulting from pouring tung oil bodied by the process of claim 1 into a solution of chlorinated rubber (Tornesit) in a solvent which is also a solvent for said oil and while stirring the mixture, and in which the amount of oil by weight is approximately seven times the amount of chlorinated rubber, and which solution contains an anti-oxidant.

7. The product which comprises a porous foundation impregnated with a gell resulting from the driving off of solvent from the solution resulting from pouring tung oil bodied by the process of claim 1 into a solution of chlorinated rubber (Tornesit) in a solvent which is also a solvent for said oil and while stirring the mixture and in which solution the amount of oil by weight is at least twice the amount of chlorinated rubber.

8. The product which comprises a porous foundation impregnated with a gell resulting from the driving off of solvent from the solution resulting from pouring tung oil bodied by the process of claim 1 into a solution of chlorinated rubber (Tornesit) in a solvent which is also a solvent for said oil and while stirring the mixture and in which the amount of oil by weight is at least twice the amount of chlorinated rubber and which solution contains an anti-oxidant.

9. The product which comprises a porous foundation impregnated with a gell resulting from the driving off of solvent from a solution which solution results from pouring tung oil bodied by the process of claim 1 into a solution of chlorinated rubber (Tornesit) in a solvent which is also a solvent for said oil and while stirring the mixture, and in which the amount of oil by weight is approximately seven times the amount of chlorinated rubber.

10. The product which comprises a porous foundation impregnated with a gell resulting from the driving off of solvent from a solution which solution results from pouring tung oil bodied by the process of claim 1 into a solution of chlorinated rubber (Tornesit) in a solvent which is also a solvent for said oil and while stirring the mixture, and in which the amount of oil by weight is approximately seven times the amount of chlorinated rubber, and which solution contains an anti-oxidant.

11. A product which comprises a sheeted porous foundation impregnated with a gell resulting from the driving off of solvent from a solution, which solution results from pouring tung oil bodied by the process of claim 1 into a solution of chlorinated rubber (Tornesit) in a solvent which is also a solvent for said oil and while stirring the mixture, and in which solution the amount of oil by weight is approximately seven times the amount of chlorinated rubber.

12. A product which comprises a sheeted porous foundation impregnated with a gell resulting from the driving off of solvent from a solution which solution results from pouring tung oil bodied by the process of claim 1 into a solution of chlorinated rubber (Tornesit) in a solvent which is also a solvent for said oil and while stirring the mixture, and in which solution the amount of oil by weight is approximately seven times the amount of chlorinated rubber, and which solution contains an anti-oxidant.

LEANDER H. HILLS.